United States Patent
Viturro et al.

(10) Patent No.: US 7,483,186 B2
(45) Date of Patent: Jan. 27, 2009

(54) PITCH TO PITCH ONLINE GRAY BALANCE CALIBRATION

(75) Inventors: R. Enrique Viturro, Rochester, NY (US); Lalit Keshav Mestha, Fairport, NY (US); Joseph D. Hancock, Rochester, NY (US); Tonya L. Love, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 102 days.

(21) Appl. No.: 11/428,489

(22) Filed: Jul. 3, 2006

(65) Prior Publication Data

US 2008/0007802 A1    Jan. 10, 2008

(51) Int. Cl.
*H04N 1/46* (2006.01)
*H04N 1/23* (2006.01)
*G03F 3/08* (2006.01)

(52) U.S. Cl. ........... 358/504; 358/515; 358/518; 358/462; 358/296

(58) Field of Classification Search ............ 358/1.15, 358/1.9, 504, 518, 1.4; 347/15, 232, 12, 347/19; 372/50.12; 399/301, 49
See application file for complete search history.

(56) References Cited

U.S. PATENT DOCUMENTS

| | | | |
|---|---|---|---|
| 5,649,073 A * | 7/1997 | Knox et al. ............... 358/1.9 |
| 6,133,932 A * | 10/2000 | Webb et al. ............... 347/232 |
| 6,494,557 B1 * | 12/2002 | Kato et al. ............... 358/504 |
| 6,556,300 B2 | 4/2003 | Tandon et al. | |
| 6,621,576 B2 | 9/2003 | Tandon et al. | |
| 6,633,382 B2 | 10/2003 | Hubble, III et al. | |
| 6,639,669 B2 | 10/2003 | Hubble, III et al. | |
| 6,755,498 B2 * | 6/2004 | Revie et al. ............. 347/15 |
| 6,804,479 B2 * | 10/2004 | Kimura ................... 399/49 |
| 6,968,148 B2 * | 11/2005 | Taka et al. ............... 399/301 |
| 7,145,676 B2 * | 12/2006 | Fan ........................ 358/1.15 |
| 2003/0043424 A1 * | 3/2003 | Bhaskar et al. ........... 358/518 |
| 2003/0112455 A1 * | 6/2003 | Ueda et al. .............. 358/1.9 |
| 2004/0052554 A1 * | 3/2004 | Harada et al. ........... 399/301 |

(Continued)

OTHER PUBLICATIONS

U.S. Appl. No. 09/566,291, filed May 5, 2000, "Online Calibration System for a Dynamically Varying Color Marking Device".

(Continued)

*Primary Examiner*—King Y Poon
*Assistant Examiner*—Akwasi M Sarpong
(74) *Attorney, Agent, or Firm*—Oliff & Berridge, PLC (57) ABSTRACT

A printer or other marking engine includes a marking material transfer device, such as a photoreceptor drum or belt, that includes a plurality of pitches. Each pitch receives an individual color of marking material and conveys the marking material to a substrate. The marking engine forms a desired image in a main image area of the substrate using marking material from one or more of the pitches, and produces a target patch pattern for each of the pitches in a margin area located outside the main image area. A measuring device such as a spectrophotometer is used to measure each target patch pattern, and based on the measured values, an individual color calibration is performed for each pitch for use in a subsequent marking operation. The color calibration may include generating or modifying a tone reproduction curve for each pitch based on the measured values. The margin area may be later trimmed off, thereby removing the portion of the substrate on which the target patch pattern is formed.

12 Claims, 5 Drawing Sheets

U.S. PATENT DOCUMENTS

| | | | |
|---|---|---|---|
| 2004/0070788 A1* | 4/2004 | Barry et al. | 358/1.15 |
| 2004/0136013 A1 | 7/2004 | Mestha et al. | |
| 2004/0136015 A1 | 7/2004 | Van de Capelle et al. | |
| 2004/0201639 A1* | 10/2004 | Hayasaki et al. | 347/12 |
| 2005/0083364 A1* | 4/2005 | Billow | 347/19 |
| 2005/0105112 A1* | 5/2005 | Fukuda | 358/1.9 |
| 2005/0264835 A1* | 12/2005 | Okita et al. | 358/1.9 |
| 2006/0197966 A1 | 9/2006 | Viturro et al. | |
| 2006/0221340 A1 | 10/2006 | Viturro et al. | |
| 2007/0013803 A1* | 1/2007 | Hoshikawa et al. | 348/335 |
| 2007/0177168 A1* | 8/2007 | Nakazawa | 358/1.4 |
| 2008/0069167 A1* | 3/2008 | Gorton et al. | 372/50.12 |

OTHER PUBLICATIONS

U.S. Appl. No. 11/242,423, filed Sep. 30, 2005, "Pitch to Pitch Online Gray Balance Calibration With Dynamic Highlight and Shadow Controls".

Lalit K. Mestha et al., "Gray Balance Control Loop for Digital Color Printing Systems," Xerox Corporation, Wilson Center for Research and Technology, Sep. 18, 2005, 5 pages.

\* cited by examiner

PITCH TO PITCH ONLINE GRAY BALANCE CALIBRATION

CROSS-REFERENCE TO RELATED APPLICATIONS

This application is related to U.S. patent application Ser. No. 09/566,291, filed on 5 May 2000 and entitled, "Online Calibration System for a Dynamically Varying Color Marking Device"; U.S. patent application Ser. No. 09/862,247, filed on 22 May 2001, now U.S. Pat. No. 6,621,576, issued on 16 Sep. 2003, and entitled, "Color Imager Bar Based Spectrophotometer for Color Printer Color Control System"; U.S. patent application Ser. No. 09/862,945, filed on 22 May 2001, now U.S. Pat. No. 6,633,382, issued on 14 Oct. 2003, and entitled, "Angular, Azimuthal and Displacement Insensitive Spectrophotometer for Color Printer Color Control Systems"; U.S. patent application Ser. No. 09/863,042, filed on 22 May 2001, now U.S. Pat. No. 6,556,300, issued on 29 Apr. 2003, and entitled, "Color Imager Bar Based Spectrophotometer Photodetector Optical Orientation"; U.S. patent application Ser. No. 09/949,475, filed on 10 Sep. 2001, now U.S. Pat. No. 6,639,669, issued on 28 Oct. 2003, and entitled, "Diagnostics or Color Printer On-line Spectrophotometer Control System"; U.S. patent application Ser. No. 10/248,387, filed on 15 Jan. 2003, and entitled, "Systems and Methods for Obtaining a Spatial Color Profile and Calibrating a Marking System"; U.S. patent application Ser. No. 10/342,873, filed on 15 Jan. 2003, and entitled, "Iterative Printer Control and Color Balancing System and Method Using a High Quantization Resolution Halftone Array to Achieve Improved Image Quality with Reduced Processing Overhead"; U.S. patent application Ser. No. 11/070,681, filed on 2 Mar. 2005, and entitled, "Gray Balance for a Printing System of Multiple Marking Engines"; U.S. patent application Ser. No. 11/097,727, filed on 31 Mar. 2005, and entitled, "Online Gray Balance Method with Dynamic Highlight and Shadow Controls"; and U.S. patent application Ser. No. 11/242,423 filed on Sep. 30, 2005 and entitled, "Pitch To Pitch Online Gray Balance Calibration With Dynamic Highlight and Shadow Controls," the disclosures of which are incorporated by reference in their entirety.

BACKGROUND

This disclosure generally relates to marking methods and systems. Embodiments are also related to developing tone reproduction curves that facilitate consistent and accurate printing from pitch to pitch on a photoreceptor and/or an intermediate transfer belt and/or other marking element.

This disclosure refers to marking as a process of producing a pattern, such as text and/or images, on a substrate, such as paper or transparent plastic. A marking engine performs the actual printing by depositing ink, toner, dye, or any other suitable patterning material on the substrate. For brevity, the word "ink" will be used to represent the full range of patterning materials, and is used interchangeably with the terms for other patterning materials.

A popular marking engine today is the xerographic marking engine used in many digital copiers and printers. In such a marking engine, a photoreceptor whose electrostatic charge varies in response to light is placed between an ink supply and the substrate. In xerographic systems, the ink is typically toner. A laser or bank of light emitting diodes is used to expose the photoreceptor to light to form an image of the pattern to be printed on the photoreceptor. In the simplest, monochromatic xerographic engines, toner is applied to the image to create a toner image on the photoreceptor, which toner image is then fused onto the substrate. In more complex systems, additional colors of toner are applied.

Figure 1:
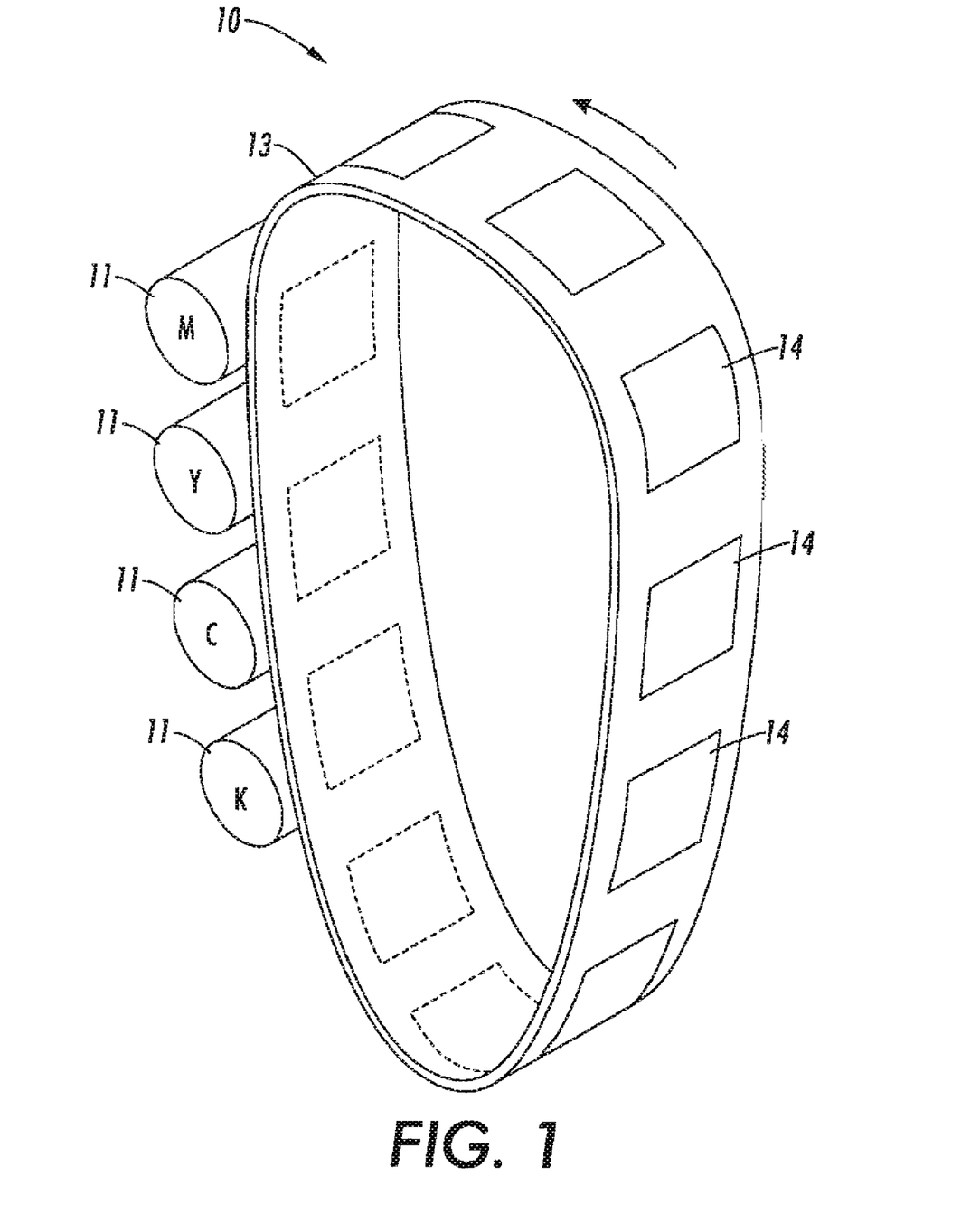
FIG. 1 schematically illustrates an Image On Image (IOI) printing engine showing multiple pitches on the photoreceptor.

Color systems include Image On Image (IOI) systems and tandem systems. In an IOI system, such as that shown schematically in FIG. 1, the engine 10 includes plural primary color applying units 11 which deposit their inks on the photoreceptor 13, such as a belt, which includes multiple image forming areas that are hereafter called pitches 14. One of the pitches 14 of the photoreceptor 13 receives the first toner image in a first color, which remains on the photoreceptor 13 while a second toner image is created in a second color atop the first image in the same pitch 14, the first and second toner images remain on the photoreceptor while a third toner image is created in a third color atop the first and second images in the same pitch, and so forth. Once all of the toner images have been placed on the photoreceptor 13, they are transferred to the substrate, typically paper, and fused to the substrate. Furthermore, after the pitch 14 has passed one of the color applying units 11, the next pitch 14 comes into alignment with that unit 11, and the image forming process starts again in the next pitch 14.

Figure 2:
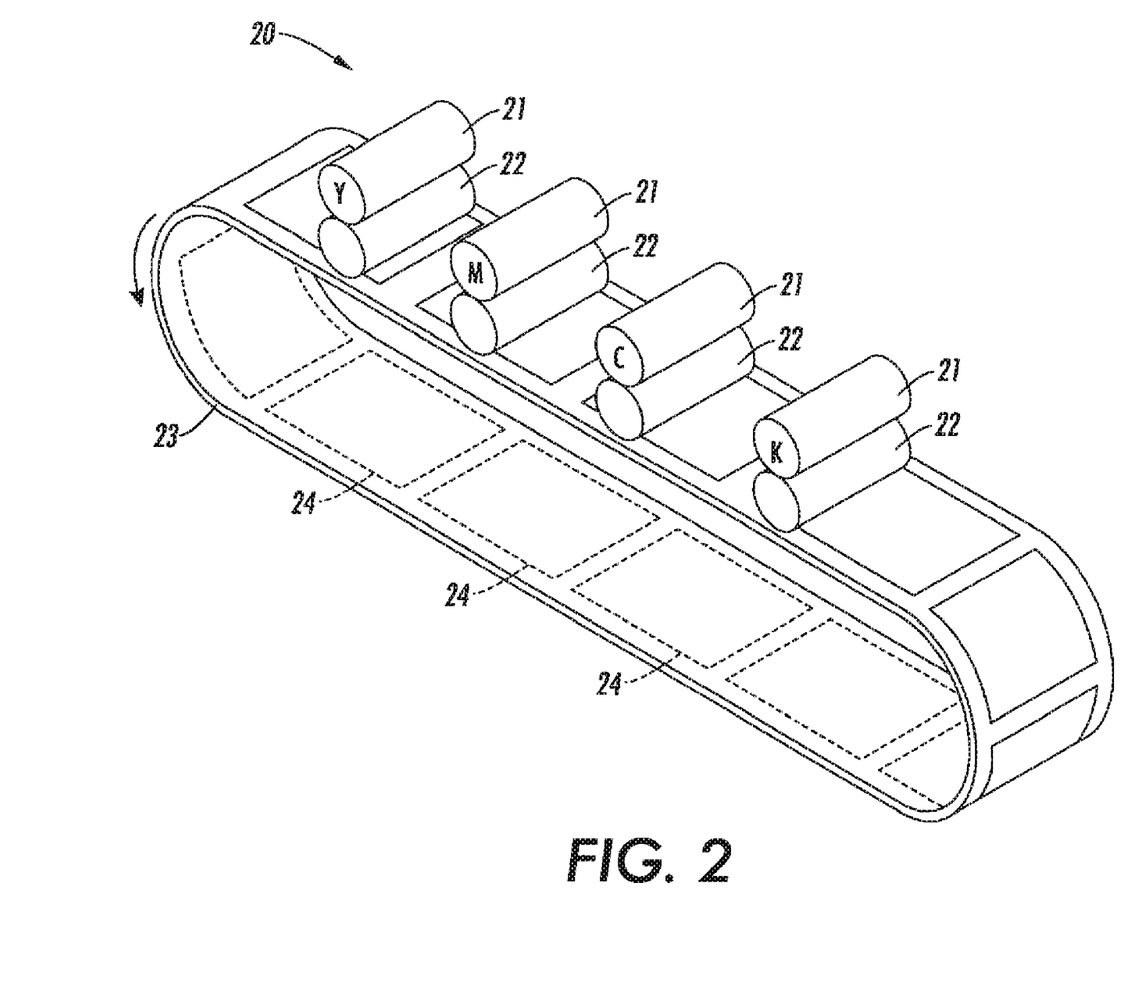
FIG. 2 schematically illustrates a tandem printing engine showing multiple pitches on the intermediate transfer belt (ITB)

In an embodiment of tandem system architecture, such as that shown in FIG. 2, the marking engine 20 includes multiple primary color applying units 21 which first deposit their inks on respective photoreceptors 22, typically drums, to form toner images, which are then deposited on the intermediate transfer belt (ITB) 23, which includes multiple pitches 24. Each toner image is transferred onto the ITB before the next toner image is formed. Like the IOI system, the toner images are fused once all for a given pitch have been deposited on the ITB.

In a variant of the tandem system shown in FIG. 2, each ink station can include an additional drum between the photoreceptor and the ITB. The additional drum accepts the toner image from the photoreceptor drum and deposits it on the ITB. The inclusion of the additional drum reduces the likelihood of toner of another color getting into a given ink source due to electrostatic interactions between the toner image on the ITB and the photoreceptor drum. Each of the printing architectures found in the marketplace has advantages, but all suffer from color reproduction problems.

It has been found that compensating for color variance throughout the color gamut of the color printer can be achieved by adjusting the ink mixture to produce gray level balance. This can be performed by printing one or more test patches based on particular requested gray levels, analyzing the output with a spectrophotometer, and generating a tone reproduction curve (TRC). The TRC is then used to alter the theoretical combination of ink to produce more accurate color with an actual combination.

When using cyan, magenta, yellow, and black inks to produce a process gray, TRCs can be used to more accurately produce a desired gray. If, for example, one desires a process gray of 128 cyan, 128 magenta, 128 yellow, and 0 black, but the marking engine used must employ 131 cyan, 127 magenta, and 130 yellow, and 0 black to achieve the desired result, TRCs can adjust the requested amounts so that the marking engine deposits 131 cyan, 127 magenta, 130 yellow, and 0 black, yielding the desired process gray. Preferably, a different TRC is used for each ink that a marking engine uses so that a CMYK marking engine will have four TRCs. TRCs can have different ranges of saturation values, such as 0 to 1, 0 to 100, or 0-255. Regardless of the input range and output range, all TRCs are used to adjust the amount of ink deposited by mapping an input value to an output value.

SUMMARY

Co-pending application Ser. No. 11/242,423 discloses embodiments that produce a target patch pattern for each pitch of a photoreceptor, and apply a separate TRC for each pitch of a photoreceptor based on the respective patch pattern, thus compensating for differences that exist among the inherent or acquired characteristics of each pitch.

This disclosure is very similar to that of the Ser. No. 11/242,423 application, but additionally discloses a different placement of a target patch pattern.

Specifically, this disclosure discusses producing a target patch pattern for each pitch in a margin of a substrate, outside the normal image forming area in which a user-controlled or user-selected image is formed. This concept may be particularly useful in, for example, large printers used by publishers or the like, which typically use oversize paper that is subsequently trimmed and/or folded during the process of producing a professional-quality document, a book or the like. For example, it is known to print on 12"×18" paper, and then trim off the margins of the paper after printing. Producing the target patch patterns for each pitch in a margin, rather than interrupting a printing process to print the target patch patterns on a separate substrate, reduces paper waste and reduces process interruption, thereby enhancing productivity and efficiency.

These and other objects, advantages and salient features are described in or apparent from the following description of embodiments.

BRIEF DESCRIPTION OF THE DRAWINGS

Exemplary embodiments will be described with reference to the accompanying drawings, in which like numerals represent like parts, and wherein.

DETAILED DESCRIPTION OF EMBODIMENTS

When equal amounts of different colors or marking material, such as cyan, magenta and yellow, are marked on white paper, a well-balanced marking engine should produce a neutral process gray of the same amount. However, the system will usually not produce that gray due to variations in color pigments of the primary colors used by the marking engine, and the internal processes of the marking engine. To overcome this effect, gray balanced TRCs obtained by iterative methods, such as those described above and disclosed in U.S. application Ser. Nos. 09/566,291, 11/070,681, and 11/097,727, incorporated by reference above, can be employed to apply the right amount of cyan, magenta and yellow proportions for all contone values depending on the state of the materials and the marking engine. This approach can be extended to produce gray balanced TRCs for spatial uniformity corrections as disclosed, for example, in U.S. patent application Ser. Nos. 10/248,387 and 10/342,873, incorporated by reference above. Additionally, as mentioned above, U.S. patent application Ser. No. 11/242,423 discloses an approach for reducing gray variations on a pitch-to-pitch basis.

In embodiments according to the present disclosure, a similar pitch-to-pitch concept is applied by producing a target patch pattern for each pitch in a margin of a substrate, outside the normal image forming area in which a user-controlled or user-selected image is formed. Other than the position of the target patch patterns, the processing and hardware may be the same as that disclosed in the Ser. No. 11/242,423 application. Additionally, although the specific calibration example of TRCs is discussed below and in the Ser. No. 11/242,423 application, any appropriate color calibration may be performed using measured values from the target patch patterns.

Embodiments thus contemplate a method to generate gray balanced TRCs that are customized to each pitch during the process of building the TRCs. This approach can be implemented in the digital front end (DFE) of a marking engine or in the image path of a marking engine, such as in a color rendition module. Embodiments are particularly advantageous when inline sensors can be used.

The calibration and control methodology of embodiments achieves high quality and consistent color balanced printing for marking engines with periodic pitch-to-pitch variations. The factors discussed above cause the magnitude of pitch signature to change over time, and the gray balanced TRCs, preferably updated frequently for each pitch, with different TRCs for each pitch, can balance such variations. Using customized TRCs for each pitch during the course of printing yields consistency between pages printed on different pitches. Additionally, embodiments can obtain a customized gray balanced CMYK TRC for each pitch using control based iterative gray balance methods with a reduced patch set. For example, embodiments including as few as twenty-two patches in a calibration patch pattern have been successful. As a result, it is easy to schedule the TRCs to gray balance the marking engine on a per pitch basis.

Figure 3:
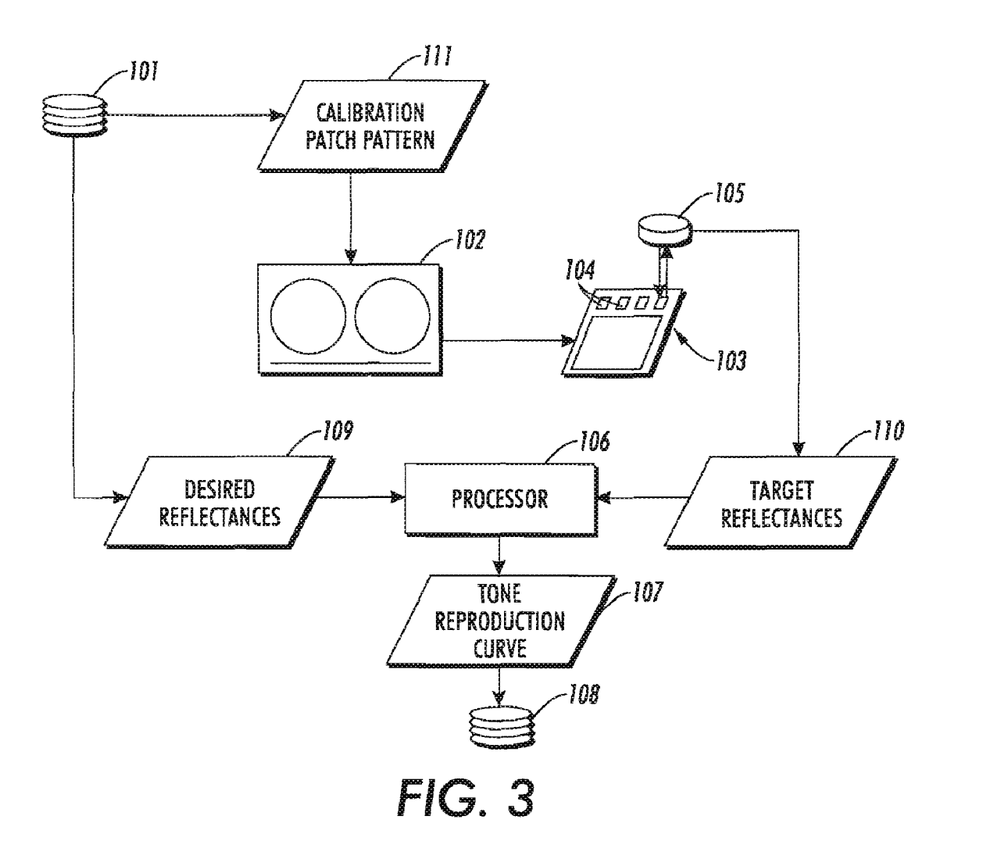
FIG. 3 schematically illustrates a marking engine undergoing calibration by producing a TRC according to embodiments.

FIG. 3 illustrates a marking engine 102 undergoing calibration according to an exemplary method of generating a tone reproduction curve that can be used in embodiments. This exemplary method is based on that disclosed in U.S. patent application Ser. No. 11/097,727, incorporated by reference above. A storage device 101 stores a calibration patch pattern 111 in the form of data. The calibration patch pattern 111 includes a number of calibration patches and every calibration patch has a desired reflectance. As such, the storage device 101 also stores desired reflectances 109. A reflectance can specify any color, including black and shades of gray. The marking engine 102 accepts the calibration patch pattern and produces a target patch pattern 103. The target patch pattern 103 includes target patches 104. Every target patch 104 is associated with a calibration patch because every target patch 104 results from the printing of a calibration patch. Examples of the particular calibration of embodiments are described below.

A reflectance measuring device 105, such as the reflectance measuring device disclosed in U.S. Pat. No. 6,384,918 to Hubble et al., which issued on May 7, 2002 and which is incorporated herein by reference, measures the target patches 104 to produce target reflectances 110. A target reflectance generally is the reflectance measurement that the reflectance measuring device 105 obtains from a target patch 103. The target reflectances 110 and the desired reflectances 109 are used by a processor 106 to produce a tone reproduction curve 107 which can then be stored on a storage device 108.

Figure 4:
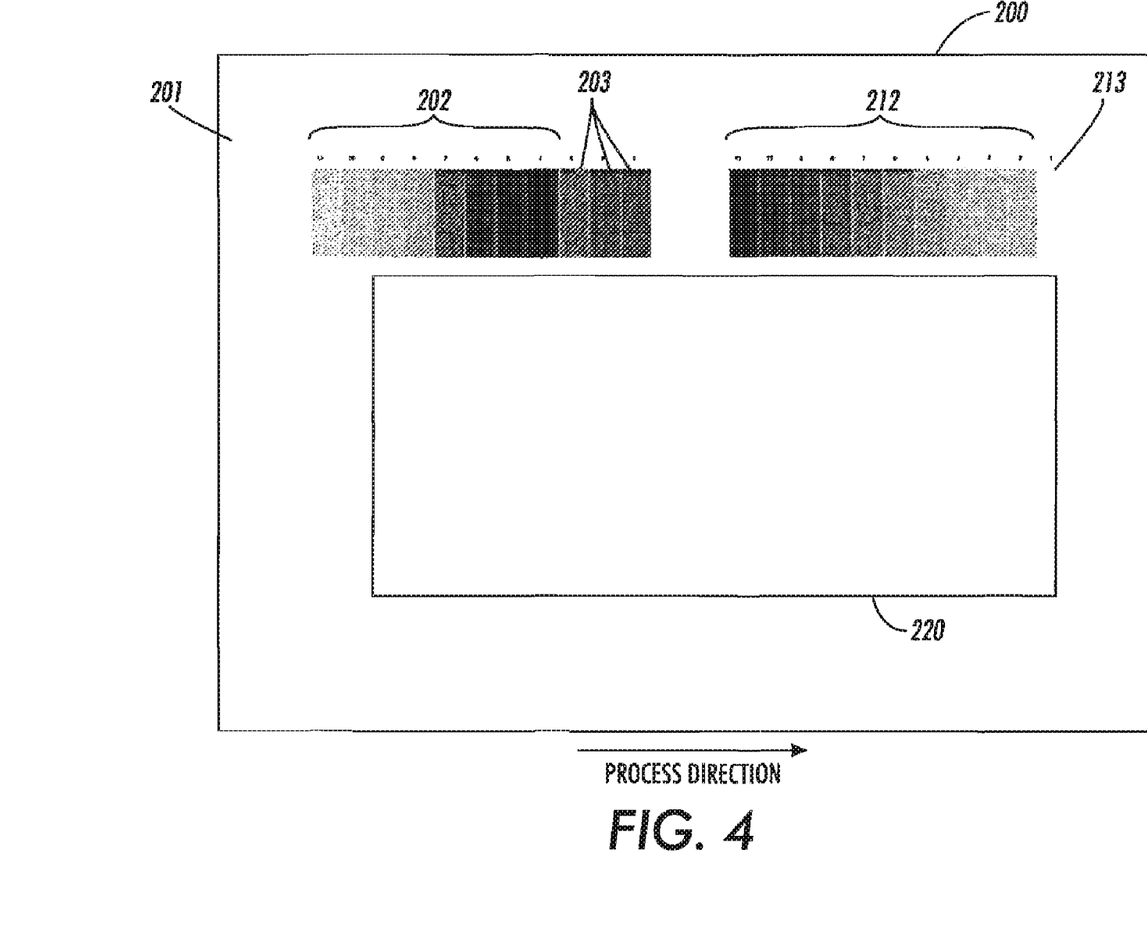
FIG. 4 schematically illustrates a possible target patch pattern according to embodiments.

FIG. 4 illustrates one possible target patch pattern that can be used in embodiments. While the pattern shown includes 22 patches, this need not be the particular number of patches or the particular configuration. Depending on factors such as speed of the substrate and accuracy of the measuring device 105, the pattern may need to span more than one substrate, as disclosed in the Ser. No. 11/242,423 application.

As shown in FIG. 4, the substrate 200 includes an image area 220, and a margin area 201 outside the image area 220. In the image area 220, a user-controlled or user-selected image, hereafter referred to as a desired image, may be produced by the marking engine. In the margin area 201, a target patch pattern is produced by the marking engine. The target patch pattern may be produced in the same marking pass as the desired image.

The target patch pattern preferably includes a series of black ink produced gray patches 202, a series of primary color patches 203, and a series of process gray patches at various saturation levels 212. The series of black patches 202 includes patches with various levels of blank ink or toner saturation across the range achievable by the printer. For example, the black patches 202 can include patches between 5% and 90% saturation. The paper outside of and between the patches can be measured to find the reflectance of unpatterned substrate areas. The black patches 202 are formed using only black ink. The series of primary color patches 203 preferably includes a saturated patch of each primary, color, such as cyan ink, magenta ink, and yellow ink. As seen in FIG. 4, embodiments can include eight black patches 202 and one primary color patch 203 for each primary color.

The series of process gray patches 212 in embodiments are printed using the CMY inks to produce gray patches. One patch 213 is preferably not marked with ink toner and can be used, for example, to characterize the substrate color. The CMY gray patches 212 may be used in conjunction with the black patches 202 to provide tone reproduction curves for cyan, magenta, yellow and black ink separations, as disclosed, for example, in U.S. patent application Ser. No. 11/097,727, incorporated by reference above. As seen in FIG. 4, the method employs ten CMY/process gray patches 212 and one unmarked patch 213, but other numbers of such patches could be employed. An exemplary method of performing an individual color calibration for each pitch will be described based on FIG. 5. Beginning in step S510, a desired image is formed in a first area of substrate, which is an image area. In step S520, which may be substantially simultaneous with step S510, an individual target patch pattern is produced for each pitch, that is, for each adjacent image forming area of a photoreceptor or other marking material transfer device. Each target patch pattern will typically include multiple patches, such as those discussed above in connection with FIG. 4. However, in some embodiments, and/or for some types of color calibration, the target patch patterns conceivably could each include only a single patch. For example, the patch could include a single mixture of color, that patch could be measured (e.g., as discussed above in connection with FIG. 3), and then a calibration could be applied for that color. Calibrations for other colors could be performed in subsequent cycles.

Figure 5:
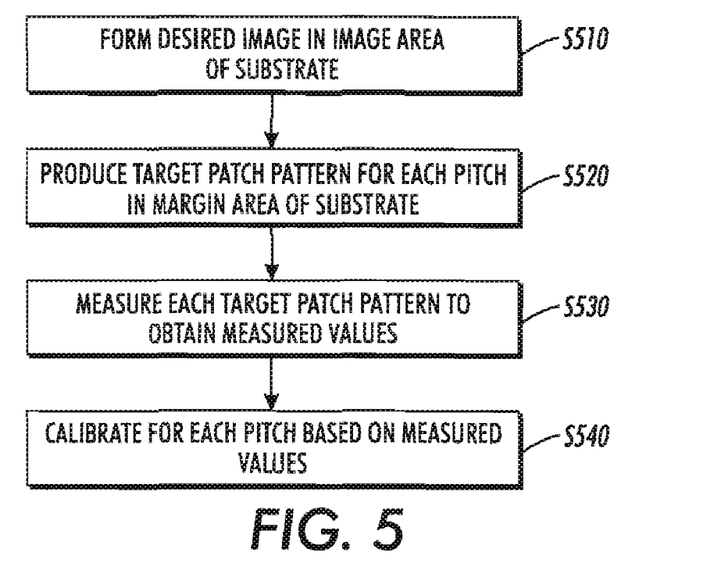
FIG. 5 schematically illustrates an exemplary calibration method according to embodiments.

Next, in step S530, each patch pattern is measured (e.g., as discussed above in connection with FIG. 3), and measured values are obtained. Finally, in step S540, a color calibration is performed for each pitch based on the measured values, for use in a subsequent marking operation.

Figure 6:
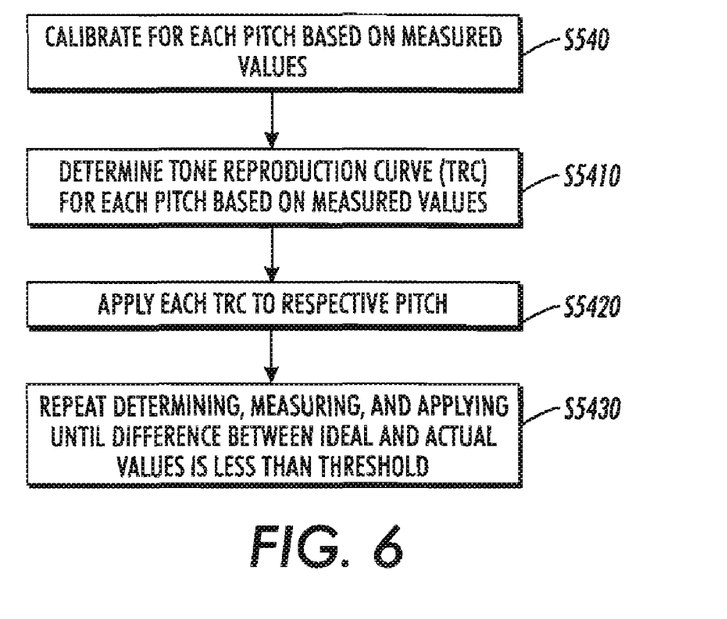
FIG. 6 schematically illustrates a specific exemplary method of calibrating for each pitch according to embodiments.

As shown in FIG. 6, the calibrating step S540 of FIG. 5 may include building gray balanced TRCs using measurements from a limited set of mixed color patches, such as those described above in connection with FIG. 4. Specifically, the calibrating step S540 may include a step S5410 of determining a TRC for each pitch based on the measured values, and a step S5420 of applying each determined TRC to the respective pitch for use in a subsequent marking operation. Optionally, the method also includes a step S5430, corresponding to step 805 of FIG. 9 of the Ser. No. 11/242,423 application, in which the producing, measuring and determining steps are repeated until the difference between ideal and actual values is less than a predetermined threshold.

Thus, gray balanced TRCs can be generated accurately according to embodiments using, for example, approximately twenty-two mixed CMY gray patches and K patches in similar fashion to that employed by some prior art methods, such as that disclosed in Mestha et al., "Gray Balance Control Loop for Digital Color Printing Systems," Proceedings of 21$^{st}$ International Conference on Digital Printing Technologies, NIP21, pp. 499-505 (2005), which is incorporated by reference in its entirety. Since embodiments use relatively few gray and black patches, it is easier to schedule the patches for measurements on a particular pitch in order to construct TRCs more frequently, thus reducing time-dependent drifts in performance.

An example of gray balance patches used to perform a color calibration by obtaining gray balanced TRCs in embodiments, using the target patch pattern of, for example, FIG. 4, employs a range of CMY gray patches 212, fully saturated primary color patches 203, and a range of black patches 202. For example, the CMY gray patches 212 can have values of 0, 5, 8, 10, 17, 25, 32, 40, 50, 60, and 74 percent saturation, the CMY solid patches 203 of 100C, 100M, and 100Y, and K patches 202 of 7.5, 10, 15, 25, 40, 55, 75, and 90 percent saturation. These particular values are advantageous in embodiments, but other values can be employed. The intervals between area coverage values are preferably irregular, and more patches are preferred to be in the highlight range of from 0 to about 20 percent saturation. These 22 patches are distributed across the neutral axis (CMY neutral and K patches) and include three saturated cyan, magenta, and yellow patches.

As with many computer-implemented methods, embodiments can be implemented in the context of modules. In the computer programming arts, a module can be typically implemented as a collection of routines and data structures that performs particular tasks or implements a particular abstract data type. Modules generally can be composed of two parts. First, a software module may list the constants, data types, variable, routines and the like that that can be accessed by other modules or routines. Second, a software module can be configured as an implementation, which can be private (i.e., accessible perhaps only to the module), and that contains the source code that actually implements the routines or subroutines upon which the module is based. Thus, for example, the term module, as utilized herein, generally refers to software modules or implementations thereof. Such modules can be utilized separately or together to form a program product that can be implemented through signal-bearing media, including transmission media and recordable media.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

What is claimed is:

1. A method of calibrating a marking engine that comprises a marking material transfer device that includes a plurality of pitches, each pitch receiving an individual color of marking material and conveying the marking material to a substrate, the method comprising:
forming a user-controlled or user-selected desired image in a first area of the substrate by transferring marking material from one or more of the pitches of the marking material transfer device to the substrate, each pitch being a separate image forming area of the marking material transfer device, each pitch receiving an individual color of marking material and conveying the marking material to the substrate, the first area being a normal image forming area in which the user-controlled or user-selected image is formed;
producing a target patch pattern for each of the pitches in a second area of the substrate, the second area being a margin area located outside the first area;
measuring each target patch pattern to obtain measured values for each patch in each target patch pattern; and
based on the measured values, performing an individual color calibration for each pitch for use in a subsequent marking operation, and thereby compensating for differences among inherent or acquired characteristics of each pitch.

2. The method of claim 1, wherein performing the calibration comprises:
determining a separate tone reproduction curve for each pitch based on the measured values; and
applying the tone reproduction curves to their respective pitches.

3. The method of claim 1, wherein producing a target patch pattern comprises:
producing at least one process gray patch;
producing at least one black-based gray patch; and
producing at least one patch of each primary color used by the marking engine.

4. The method of claim 3, wherein producing at least one process gray patch includes producing a plurality of process gray patches with an area coverage value in the range of from about 0 to about 100 percent.

5. The method of claim 3, wherein producing at least one black-based gray patch includes producing a plurality of patches with area coverage values in the range of from about 0 to about 90.

6. The method of claim 3, wherein producing at least one patch for each primary color used by the printer includes producing patches of each primary color with area coverage values of about 100.

7. The method of claim 1, wherein measuring includes employing a color sensor to measure L*a*b* values of the patches of each target patch pattern.

8. The method of claim 2, wherein determining a tone reproduction curve comprises:
obtaining calibration data comprising at least one target saturation and at least one maximum desired saturation;
using the calibration data to produce a tone reproduction curve, thereby setting said tone reproduction curve for use in printing saturated areas.

9. A system comprising:
a marking engine that includes a marking material transfer device that includes a plurality of pitches, each pitch receiving an individual color of marking material and conveying the marking material to a substrate, each pitch being a separate image forming area of the marking material transfer device;
a first storage device adapted to store a target patch pattern for each pitch;
the marking engine marking a user-controlled or user-selected desired image on a first area of a substrate by transferring marking material from one or more of the pitches of the marking material transfer device to the substrate, and producing a target patch pattern for each of the pitches in a second area of the substrate based on the stored target patch pattern, the first area being a normal image forming area in which the user-controlled or user-selected image is formed, the second area being a margin area located outside the first area;
a color measuring device that obtains a target reflectance from each target patch of the target patch pattern;
a processor that determines an individual color calibration value for each pitch, based on the target reflectances, thereby compensating for differences among inherent or acquired characteristics of each pitch; and
a second storage device adapted to store the color calibration value for each pitch of the marking material transfer device for use in a subsequent marking operation.

10. The system of claim 9, wherein the processor determines at least one tone reproduction curve based on the target reflectances.

11. The system of claim 9, wherein the marking material transfer device is a photoreceptor.

12. The method of claim 1, wherein the marking material transfer device is a photoreceptor.

* * * * *